(No Model.) 4 Sheets—Sheet 1.
C. BAILLIE.
MACHINE FOR CUTTING CARD BOARD.
No. 309,433. Patented Dec. 16, 1884.
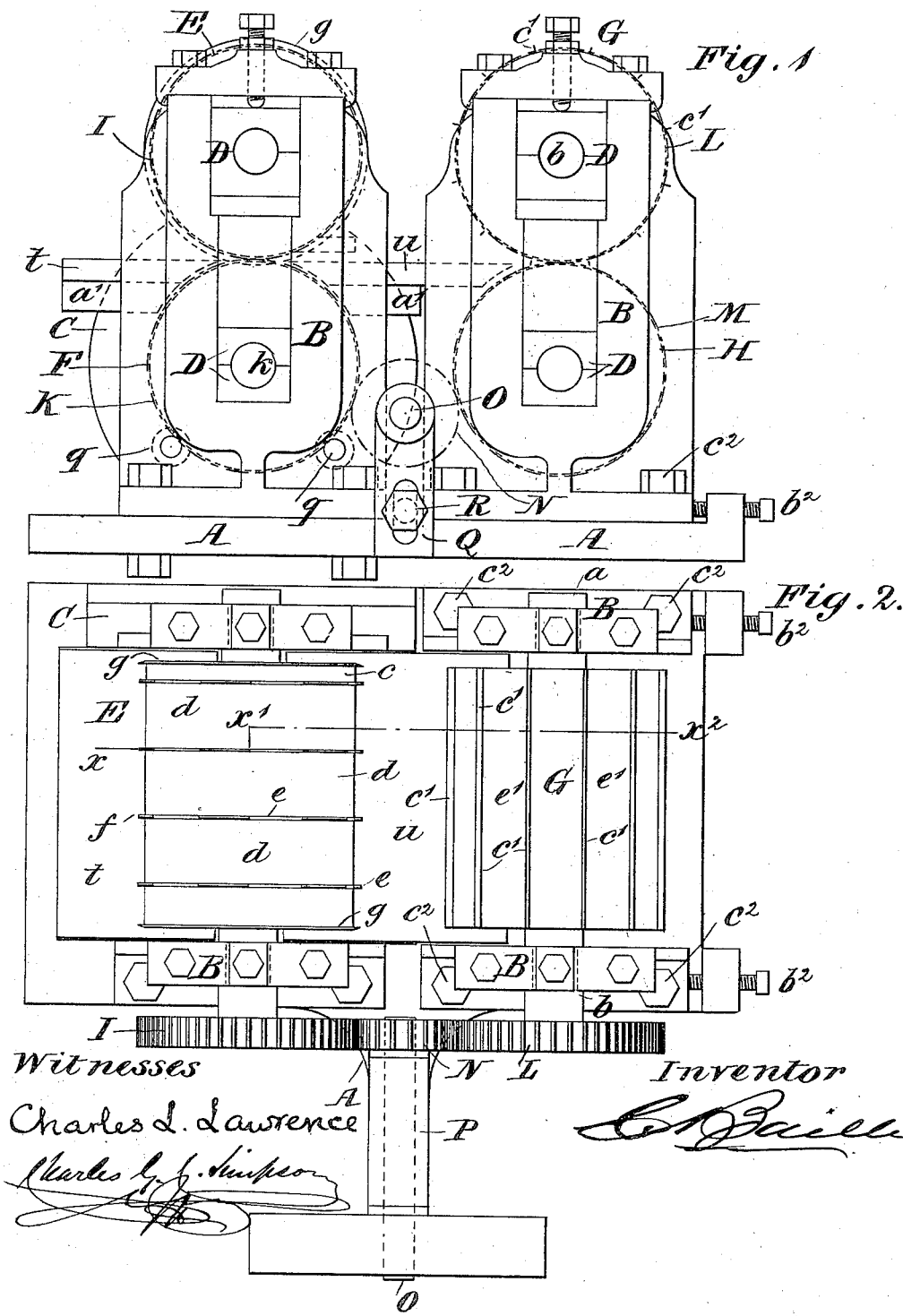

(No Model.) 4 Sheets—Sheet 2.
C. BAILLIE.
MACHINE FOR CUTTING CARD BOARD.
No. 309,433. Patented Dec. 16, 1884.

Witnesses.
Charles L. Lawrence
Charles G. C. Simpson

Inventor.
C. Baillie

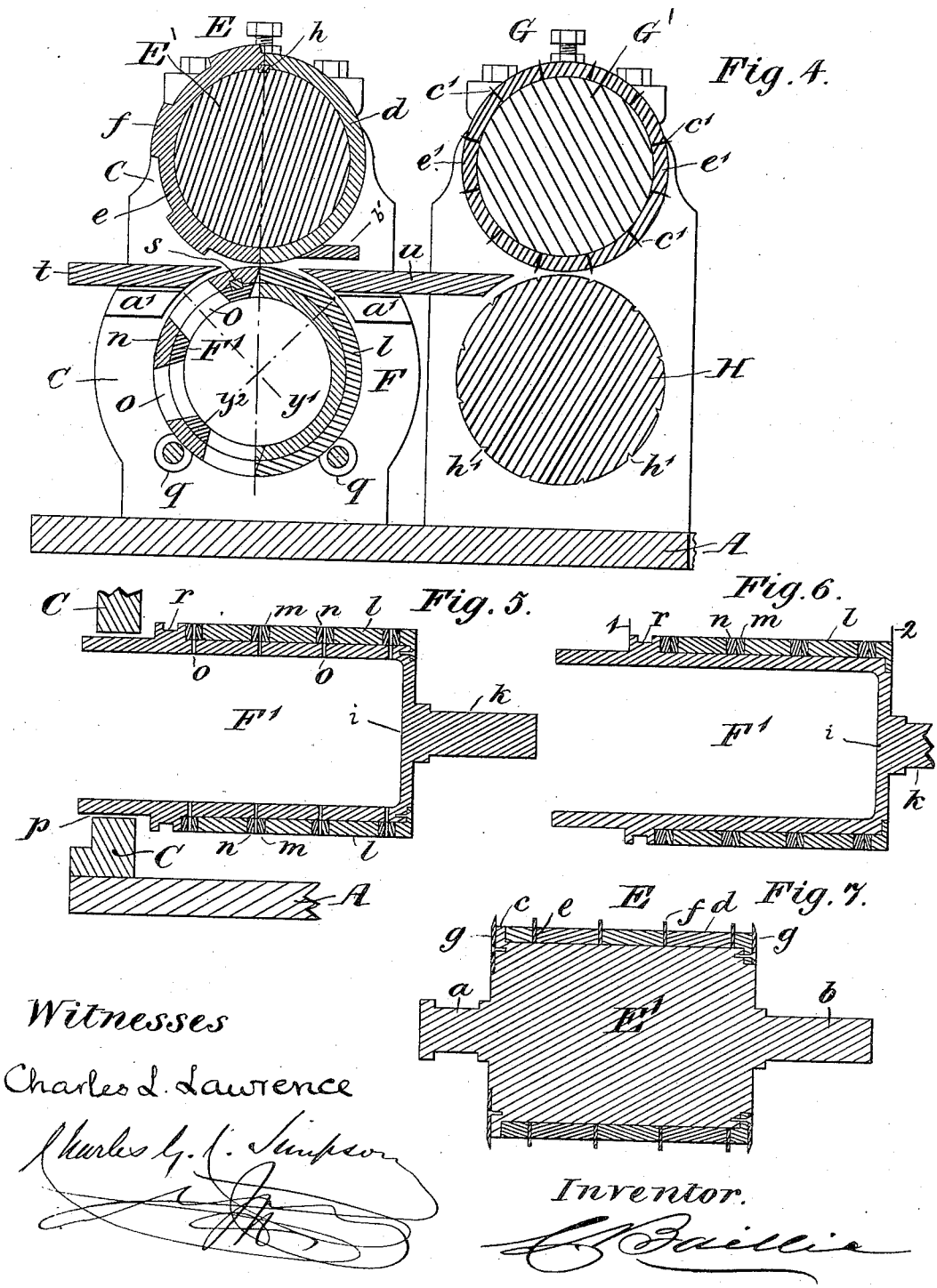

(No Model.)  4 Sheets—Sheet 4.
C. BAILLIE.
MACHINE FOR CUTTING CARD BOARD.
No. 309,433.  Patented Dec. 16, 1884.
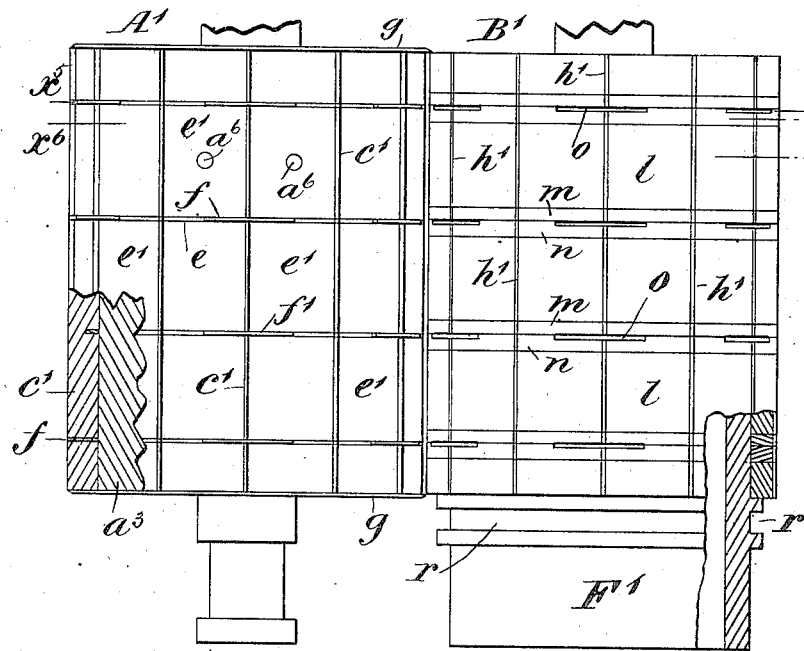
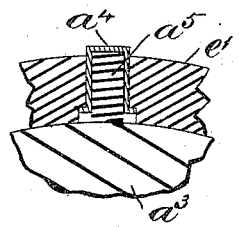
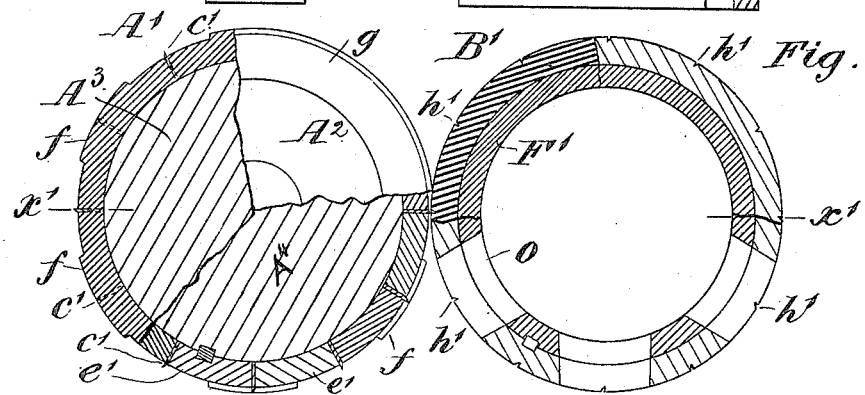
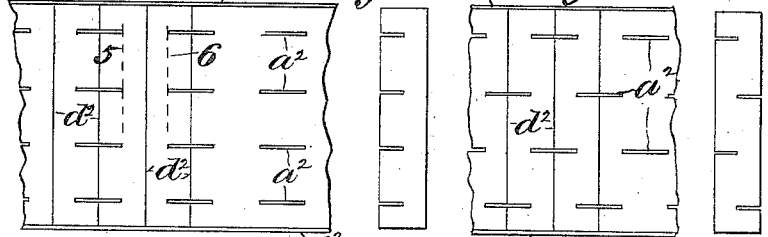
Witnesses  Inventor.
Charles L. Lawrence
Charles G. C. Simpson  C. Baillie

UNITED STATES PATENT OFFICE.

CHARLES BAILLIE, OF MONTREAL, QUEBEC, CANADA.

MACHINE FOR CUTTING CARD-BOARD.

SPECIFICATION forming part of Letters Patent No. 309,433, dated December 16, 1884.

Application filed March 6, 1884. (No model.)

*To all whom it may concern:*

Be it known that I, CHARLES BAILLIE, of the city of Montreal, in the District of Montreal, Province of Quebec, Canada, merchant, have invented certain new and useful Improvements in Machines for Cutting Card-Board, &c.; and I do hereby declare that the following is a full, clear, and exact description of the same.

This invention has reference to an improved construction of rolls for cutting up card-board and similar substances, and the particular features in which it consists will be hereinafter set forth and claimed.

Figure 3:
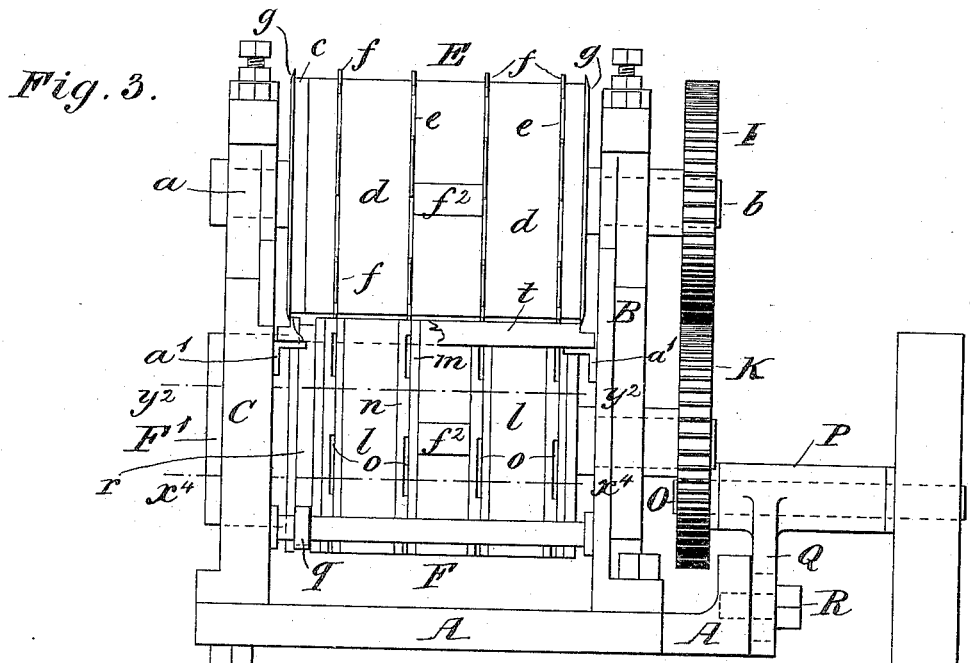
Figure 8:
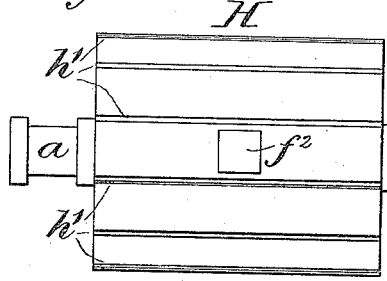

In the drawings hereunto annexed similar letters of reference and numerals indicate like parts, and Figure 1 is a side elevation of a machine embodying my invention. Fig. 2 is a plan of the machine shown in Fig. 1. Fig. 3 is a front elevation of the machine shown in Figs. 1 and 2. Fig. 4 is a vertical longitudinal sectional elevational view of the said machine, taken on line $x$ $x'$ $x^2$, Fig. 2. Fig. 5 is a longitudinal central section of the recess-roll taken at a point where the recesses or openings are situated, or on line $y'$, Fig. 4, and line $x^4$ $x^4$, Fig. 3, and showing in section the arrangement of the same in connection with one of the housings. Fig. 6 is a similar section of the same roll shown in Fig. 5, but taken on line $y^2$, Fig. 4, and line $y^2$ $y^2$ in Fig. 3. Fig. 7 is a longitudinal central section of roll provided with punching or cutting projections. Fig. 8 is an elevation of roll having longitudinal V-shaped recesses upon it. Figs. 9, 10, 11, 12, and 13 are details of construction of rolls. Fig. 14 is a plan showing a modification of the rolls. The parts of this figure shown in section are taken on lines $x'$, Fig. 15. Fig. 15 is a view, partly in section and partly in elevation, of the rolls shown in Fig. 14, the sectional parts being taken on lines $x^2$, $x^3$, $x^4$, $x^5$, and $x^6$, Fig. 14. Figs. 16, 17, 18, and 19 are illustrations of the effects produced by the rolls delineated.

Letter A is any suitable bed or base plate, and, as shown in Figs. 1, 2, 3, and 4, it has secured upon it four housings—three B, and one C—for holding the bearings D for the journals of the rolls E, F, G, and H, which are arranged to revolve together by gear-wheels I, K, L, and M, of equal size, one of each being secured on the axle of each roll E, F, G, and H. Recesses or openings O are formed in the hollow cylinder F' by removing a portion of the body of said cylinder, and by removing a portion of the body of the rings $n$ the said openings O are practically extended through these said rings. These said openings will be in size and location made to agree with and receive within them the projections $f$ of the rings $e$. The said gears are arranged as shown. The gear I on roll E intermeshes with the gear K on roll F, and the gear L on roll G intermeshes with the gear M on roll H.

N is an adjustable pinion secured on a shaft, O, carried in a socket or long bearing, P, made in one with an arm, Q, attached on a projection of the bed A by a slot in the arm Q, and screw-bolt R, as shown. The pinion N is set to intermesh at the same time with the gears K and M, which causes the whole of the four said rolls to equally revolve in the required directions, the said pinion being revolved in the direction of the arrow in Fig. 1, and in a similar manner to that in which many four-roll machines at present in use are arranged. Therefore there is nothing new in what I have above described.

For the sake of clearness of description I will first describe the construction of each of the four rolls separately, and afterward the manner in which they operate in combination.

The roll E (see Figs. 2, 3, 4, and 7) consists of a solid cylinder, E', provided with journals $a$ $b$, (the latter being elongated for the gear-wheel I to be secured upon it,) and an end flange, $c$. Upon E' are placed distance rings $d$, which hold in place at the required positions a number of rings, $e$, provided with segmental projections $f$. In Fig. 4 the section of the roll E is given half a section on $d$ and half a section on $e$, or on lines $x$, $x'$, and $x^2$, Fig. 2. I would here explain that the length circumferentially of the projections $f$ will depend upon the length of longitudinal slots required to be formed in the material acted upon, as will be hereinafter fully explained. Although the roll E is delineated as having four rings, $e$, it may be provided with any number required, and a corresponding number of rings, $d$. On the ends of the roll E (but not necessarily on the ends) are secured by pins, as shown, sharp-edged ring-cutters $g$, the functions of which are to trim off the edges of the material acted upon.

$h$ is a key for securing all the rings $d$ and $e$ circumferentially in place. It extends from the flange $c$ to the opposite end of the roll E.

Although, as shown in the drawings, the projections $f$ are represented as being equal with one another in length and position upon the roll E circumferentially, yet they may, if required, be of unequal lengths and set with relation to one another circumferentially in any desired positions, according to the work to be performed by them, which must be taken into consideration at the time the roll E is being constructed.

The roll F, consists of a hollow cylinder, F', (see Figs. 3, 4, 5, and 6,) having a solid end, $i$, and elongated journal $k$, on the outer end of which the gear-wheel K is secured to revolve it by. The opposite end of this cylinder is left open. From the point 1 to the point 2 the roll F is made equal in length to the length of the roll E between the cutters $g$. It is provided with distance-rings $l$ and $m$ and recessed rings $n$. The outer diameter of the rings $l, m$, and $n$ is equal to the outer diameter of the rings $d$ in roll E. The roll F might consist of a hollow cylinder of equal outer diameter with the rings $d$ of roll E, only I prefer to make it as described, because the edges of the recesses or openings $o$ are cutting-edges, and therefore become blunt with use and require to be sharpened, which could not well be done if the roll were so made, whereas new rings $m$ $n$ can at any time be provided and the balance of the roll F be used therewith. The journal $k$ is received and revolves in the lower bearings, D, of the housing B, opposite to the housing C. This housing C is made in its upper part substantially like the housing B; but in its lower part it is made with an opening, $p$, (see Fig. 5,) so that the end of the cylinder F' may revolve freely therein. The cylinder F' may be carried by forming said opening $p$ into a bearing, or, as shown, by friction-rolls $q$, running in a groove, $r$, formed in a projection of the cylinder F'. The axles of the rolls $q$ are journaled in the housings B and C. The rolls E and F are set a distance apart from each other about equal to the thickness of the card-board, &c., to be acted upon, so that they will fairly grip but not compress its bulk in any permanent manner.

$s$ is a key extending from the projection, having the groove $r$, to the opposite end of the cylinder F'. By this all the rings $l$, $m$, and $n$ are held in place circumferentially upon the cylinder F'.

In securing the gears I and K upon the rolls E and F great care must be taken to have this done so as to bring the corresponding projections, $f$, on roll E as they revolve to agree with the corresponding recesses or openings, $o$, in the roll F.

$t$ is a table in front of the rolls E F, upon which is laid the material to be operated upon, and $u$ is a table for receiving the said material and guiding it to the rolls G and H. These two tables may be carried and secured, as shown, on brackets or angle irons $a'$, attached to the housings, or the tables may be supported from the bed A, as desired.

Figure 9:
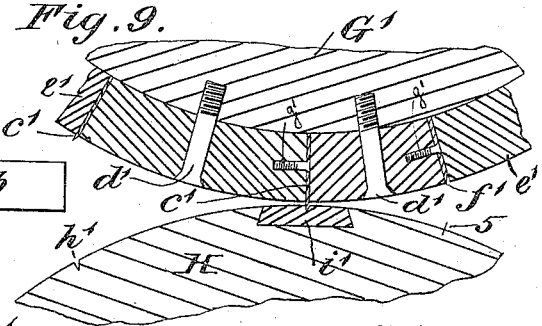

$b'$ is a scraper to prevent the first end of the material as it comes through between the rolls from following round with the roll E, instead of passing on to be acted upon by the rolls G and H. The roll G consists of a solid cylinder, G', to which is fitted a hollow cylinder having an outer diameter equal to the outer diameter of the rings $l$ and $d$ of the rolls E and F, and after this cylinder has been fitted to the cylinder G', and turned true on its outside surface and ends, I lay out upon it lines representing the grooves required for holding longitudinal cutters or cutting-blades $c'$, for cutting the said material to be acted upon transversely. Having determined the positions of the cutters $c'$ and such other appliances as may be attached in this roll G, I proceed to insert a number of pins, $d'$, through the outer cylinder, screwed into the cylinder G'. I next cut the outer cylinder with grooves into such segments $e'$ as may be required to hold between them the cutters $c'$. These cutters, as shown in Figs. 2 and 4, are all set equally distant apart on the circumference of the roll, and all extend from one end of it to the other; but they may, if desired, be set at such distances as may be required circumferentially, and be made and situated longitudinally, as required in length and position. The work to be accomplished by this roll must be taken into consideration at the time of its construction. This roll may also be provided with scoring-blades $f'$, which only project beyond the surface of the segments $e'$ a sufficient amount to make a sufficient incision or indentation in the said material to cause it, when required, to bend at these incisions or scores or indentations without detachment or breaking. $g'$ are pins inserted through the cutters $c'$, and scoring-blades $f'$, for securing them in position with the segments $e'$. The cylinder G' is provided with journals $a$ $b$, similar to those shown to roll E in Fig. 7. The gear-wheel L is attached on journal $b$. (See Fig. 2.) The roll H consists of a solid cylinder. (See Figs. 1, 4, 8, and 9.) It is provided with journals $a$ $b$, as above described, on the latter of which the gear M is secured. On the periphery of the roll H are cut grooves $h'$, as shown, agreeing with the cutters $c'$, with which the roll G' has been provided. These may be, as shown, of V shape, or any suitable shape desired. As shown in Fig. 9, the grooves $h'$ may be either formed in the roll H, or in dies $i'$, inserted in the roll. No groove $h'$ will be provided for the scoring-blades $f'$. The one shown will probably come over the roll G at the point where line 5 is situated. Again, in securing the gears L M upon the journals of the rolls G and H great care must be taken to set them circumferentially right to operate in proper time with each other.

Figure 10:
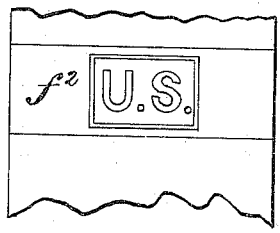
Figure 11:
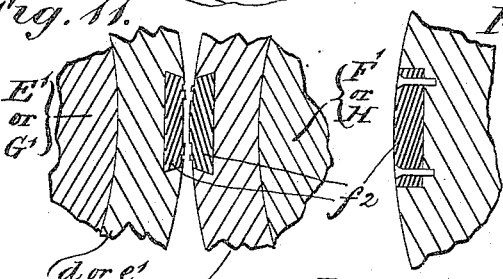
Figure 12:
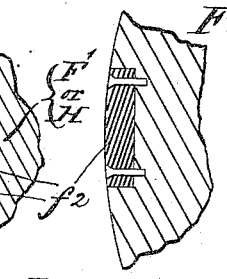

I will now describe the action or operation of all the said rolls combined, and afterward describe the modification of these rolls and the manner of embossing the material at the same time that it is being cut with the rolls. The material to be cut may be slightly greater in width than the length of the roll E between the cutters $g$, or not, as desired. It (the material) is laid upon the table $t$, which may be of any desired length and provided with any ordinary suitable guides to hold the material central and parallel to the line of action of the rolls. These said guides and elongated table $t$ are not shown in the drawings, as it is not intended to treat them as any part of the present invention. The material is first pushed into the rolls by hand, and, being caught by the projections $f$, is drawn into the rolls as required, and during one revolution of the rolls E and F is cut by each of the projections $f$, with which the roll E is provided, forming long narrow slots $a^2$, (or short ones, if desired,) as shown in Fig. 16. I would here remark that the projections $f$ and cutters $c'$ and $g$ are only made to project beyond the general surface of the rolls E and G a sufficient amount to fairly cut the material where required, but to do this without risk of failing to do it. The rolls G and H must be set exactly parallel to the rolls E and F, and at a proper "time" and distance to act therewith in a proper manner upon the material provided with the openings $a^2$, so that they will cut the material at the proper place, which in this case we will suppose to be alternately between and central with the openings $a^2$, as indicated by the lines $d^2$, Fig. 16. The said adjustment will be obtained very nearly by adjusting the position of the teeth of the gear-wheel M with those of the pinion N; but in case this cannot be accomplished with the required exactness, for it may be found that by the change of one tooth of the gear M and pinion N that too great an adjustment is given, then I have provided the adjusting-screws $b^2$, which, by having the holes in the bases of the housings B elongated, through which the bolts $c^2$ pass, enable the housings and rolls G H to be moved bodily to give the required exactness of adjustment. The material passes on from the rolls E and F to the rolls G and H, which cut it transversely into strips by making the cuts indicated by the lines $d^2$, thus giving as a product pieces of material as shown in Fig. 17. $e^2$ are the parts supposed to be trimmed off by the cutters $g$. The pieces of material shown in Fig. 17 are similar to those required to form egg-carriers. Again, with the same rolls E and F acting upon the material, as above described, and forming the opening $a^2$, but with the rolls G and H set to cut at lines 5 and 6, the machine would cut the material into strips the length of which would be the width of the material, less the trimmings $e^2$, with five short rectangular pieces to each such strip. Such an arrangement might be useful for some purposes, but not to form egg-carriers. Again, if the projections $f$ of the roll E were set alternately circumferentially, as also the recesses $o$ of the roll F, the openings $a^2$ would be formed as shown in Fig. 18, and, being cut at the lines $d^2$ by the rolls G and H, would produce the pieces of material shown in Fig. 19. I cause embossed figures, patterns, or marks to be formed on the material by inserting in the rings $d$, or segments $e'$, rings $l$, or roll G, as desired, dies $f^2$, on one of which the figures, patterns, or marks are formed by projections, and in the other they are recessed. (See Figs. 10, 11, and 12.) Suppose the letters "U S," inclosed in a marginal border, are to be embossed upon the material, then the said figures of the drawings show how this is to be arranged, it being much cheaper to do the work at the time of cutting with the rolls than by a separate operation. In Fig. 12 the die $f^2$ is let bodily into the roll or ring, and secured in place by screw-pins, instead of being dovetailed, as shown in Figs. 10 and 11. The pieces of material accumulating in the roll F will fall out or be removed, as required, at the open end of it.

I now come to the modification of the rolls shown in Figs. 13, 14, and 15, where two rolls, A' and B', are provided with all the appliances with which the four rolls E, F, G, and H are provided. Here the roll A' consists of a solid cylinder, $a^3$, Fig. 14, upon which is fitted a cylinder, which, after being marked out with regard to the grooves that are to be formed in it, is pinned on, as shown in Fig. 9, with the segments $e'$ upon the cylinder G', after which it is cut by circumferential and longitudinal grooves as desired. In the circumferential grooves are placed the rings $e$, having projections $f$, as hereinabove described, and in the longitudinal grooves are secured the cutters C' in substantially the same manner as shown in Fig. 9.

In Fig. 15 the roll A is shown in three parts. Part $A^2$ is an end elevation, part $A^3$ is a section on line $x^5$, Fig. 14, and part $A^4$ is a section on line $x^6$, Fig. 14.

$g$ are the edge-cutters, the same as used with the roll E.

The roll B' consists of a hollow cylinder, F', similar in all respects to that hereinabove described, having recesses or openings $o$, rings $l$, $m$, and $n$, axle $k$, and open end, as shown and described, and is further provided with the grooves $h'$, similar to those shown and described for roll H, situated to agree with the cutter $c'$. The roll A' may be also provided with any desired scorers $f'$, (see Fig. 9,) suitable grooves being formed in the segments $e'$ for their reception. These rolls A' and B' are provided with gears to cause them to revolve equally together, and are set the desired distance apart to grip the material to be operated upon. These rolls A' and B', as above described, are in themselves the equivalent of the four rolls E, F, G, and H, above described. Now, as the material is at once cut longitudinally and transversely by the roll A', there is a danger of the pieces of material remaining attached between the cutters, and to obviate all danger of this I provide the segments $e'$ with spring-heads $a^6$. These consist of a cap, $a^4$, let in from the inner side of the segment and actuated by a spiral spring, $a^5$. (See Fig. 13.)

The above-described spring-heads yield as they pass between the rolls A' and B', but spring out again when they have passed through, thus forcing out any portions of the material that may have lodged between the cutters. These spring-heads will be provided to all or any of the segmental pieces $e'$ desired, and they will be so located that they will not prevent the said segmental pieces from being provided with embossing-dies $f^2$, if required.

What I claim, and wish to secure by Letters Patent, is as follows:

1. The combination of the roll E, provided with projecting cutters $f$ and $g$, hollow roll F, having recesses or openings $o$, roll G, provided with cutters $c'$, and roll H, having grooves $h'$, the whole substantially as described and shown, for the purposes set forth.

2. The combination of the roll E, consisting of a solid cylinder, E', rings $d$, and rings $e$, having elongated projections $f$, all constructed and arranged, as described, with the roll F, consisting of a hollow cylinder, F', having openings $o$, rings $l$ and $m$, and recessed rings $n$, constructed and arranged, as described, to cut longitudinal slots in the material acted upon, the whole substantially as described.

3. The combination of the roll G, consisting of a solid cylinder, G', segments $e'$, and cutters $c'$, constructed and arranged, as described, with the roll H, provided with recesses $h'$, constructed and arranged thereon, as described, the whole substantially as and for the purposes set forth.

C. BAILLIE.

Witnesses:
CHARLES G. C. SIMPSON,
CHARLES L. LAWRENCE.